(12) United States Patent
Chang

(10) Patent No.: US 8,379,930 B2
(45) Date of Patent: Feb. 19, 2013

(54) DISTANCE MEASURING SYSTEM

(75) Inventor: Jen-Tsorng Chang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 408 days.

(21) Appl. No.: 12/826,675

(22) Filed: Jun. 30, 2010

(65) Prior Publication Data

US 2011/0158481 A1    Jun. 30, 2011

(30) Foreign Application Priority Data

Dec. 30, 2009    (CN) .......................... 2009 1 0312713

(51) Int. Cl.
*G06K 9/00* (2006.01)
(52) U.S. Cl. ...................................................... 382/106
(58) Field of Classification Search .................. None
See application file for complete search history.

(56) References Cited

U.S. PATENT DOCUMENTS

| 5,137,350 | A | * | 8/1992 | Misawa et al. | ............... | 356/3.03 |
| 5,148,211 | A | * | 9/1992 | Kotani et al. | ................. | 396/123 |
| 5,321,460 | A | * | 6/1994 | Yoshida | ....................... | 396/109 |
| 6,094,270 | A | * | 7/2000 | Uomori et al. | ............... | 356/623 |
| 8,130,368 | B2 | * | 3/2012 | Eno et al. | ..................... | 356/5.01 |

* cited by examiner

*Primary Examiner* — Tom Y Lu
(74) *Attorney, Agent, or Firm* — Altis Law Group, Inc.

(57) ABSTRACT

A distance measuring system includes a light source module, an image capturing device, a signal processing unit, a selecting unit, and a distance calculating unit. The light source module is configured for emitting a first and a second infrared light beams in an asynchronous manner. The first infrared light beam has a same intensity with the second infrared light beam. The image capturing device is configured for capturing images of the first and second infrared light beams reflected by a measurement object. The signal processing unit is configured for analyzing the images of the first and second infrared light beams reflected by the measurement object to determine intensities thereof. The selecting unit is configured for selecting one of the first and second reflected infrared light beams whichever has a greater intensity. The distance calculating unit is configured for calculating a distance to the object from to the distance measuring system.

20 Claims, 4 Drawing Sheets

DISTANCE MEASURING SYSTEM

BACKGROUND

1. Technical Field

The present disclosure generally relates to measuring systems, and more particularly, to a system for measuring distance of an object relative to the system.

2. Description of the Related Art

It is a known law of physics that an intensity of light received from a light source is inversely proportional to a distance from the light source. Accordingly, it theoretically follows that distance of an object may be measured by reflecting a light beam from the light source with a predetermined intensity and detecting the intensity of the reflected light beam.

One problem of measuring the distance is that the light reflectance of a measurement object may vary with the changing of its shape. Because of these unknown variations, accurate measurements of the distance are difficult to achieve.

Therefore, what is needed, is a distance measuring system that can overcome the described limitations

BRIEF DESCRIPTION OF THE DRAWING

Many aspects of the disclosure can be better understood with reference to the following drawings. The components in the drawings are not necessarily drawn to scale, the emphasis instead being placed upon clearly illustrating the principles of the present system. Moreover, in the drawings, all the views are schematic, and like reference numerals designate corresponding parts throughout the several views.

DETAILED DESCRIPTION

Embodiments of the system will now be described in detail below and with reference to the drawings.

Figure 1:
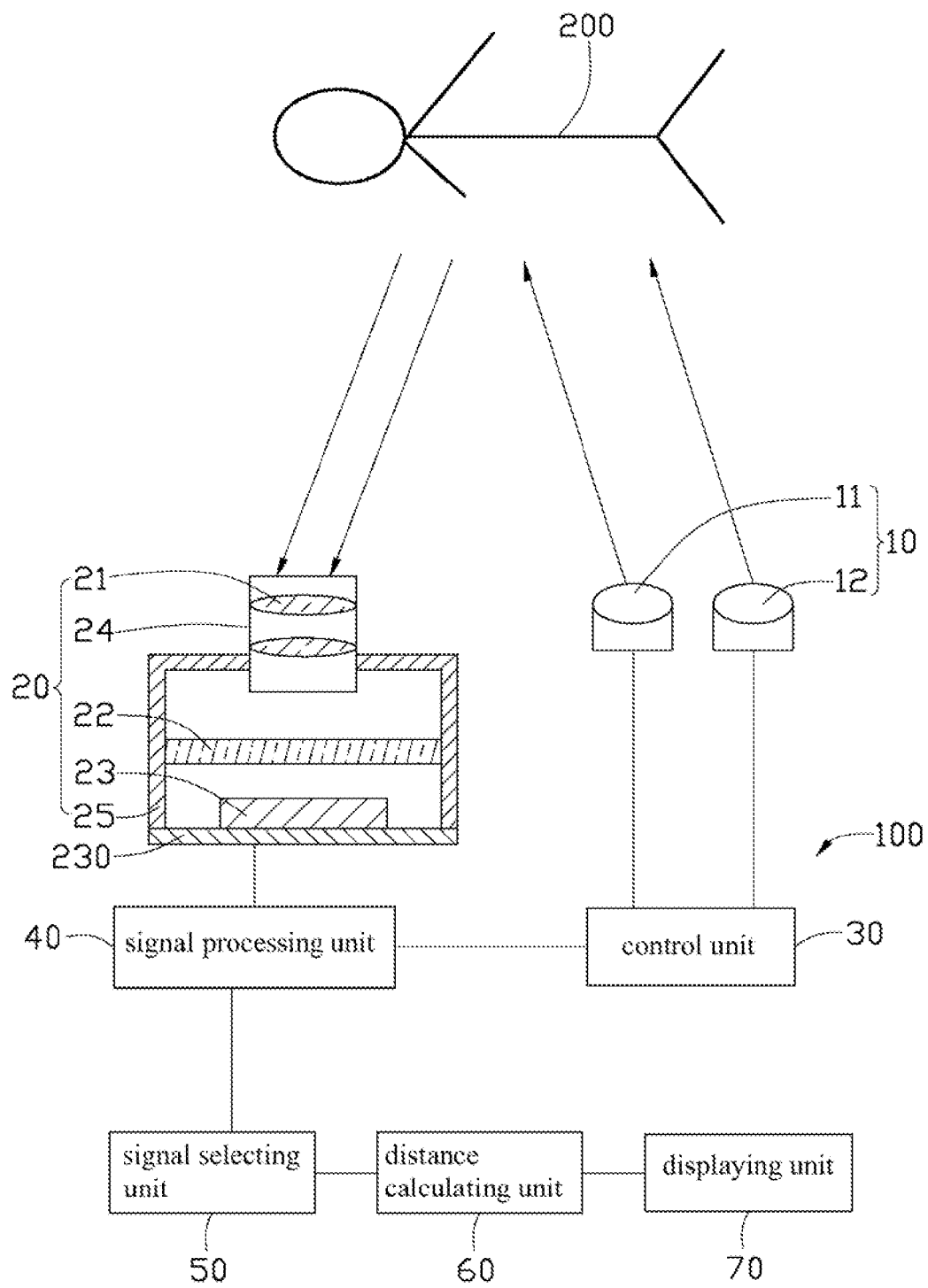
FIG. 1 is a schematic view of a distance measuring system in accordance with an exemplary embodiment.

Referring to FIG. 1, a system 100 in accordance with an exemplary embodiment includes a light source module 10, an image capturing device 20, a control unit 30, a signal processing unit 40, a selecting unit 50, a distance calculating unit 60, and a display device 70.

In this embodiment, the light source module 10 includes a first light source 11 and a second light source 12. Both of the first and the second light sources 11 and 12 can be a point light source, such as a light emitting diode (LED). The LED may for example, be an infrared-emitting diode (IRED) for emitting an infrared light beam. The first and the second light sources 11 and 12 are spaced from each other. In this embodiment, the first light source 11 is configured for emitting and directing a first infrared light beam with a first wavelength band. The second light source 12 is configured for emitting and directing a second infrared light beam with a second wavelength band.

Figure 2:
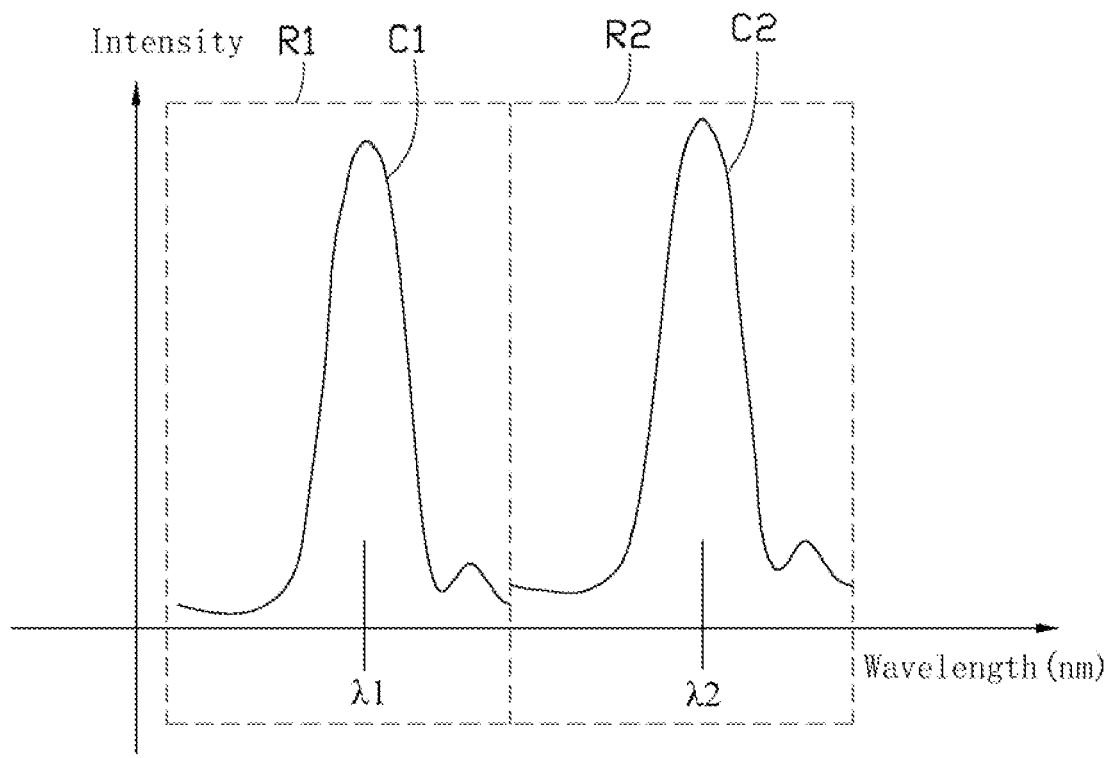
FIG. 2 shows a graph of light output spectrum of a first light source and a second light source of the system of FIG. 1.

In one typical manner, the first and the second light sources 11 and 12 each emit infrared light beams in the form of continuous amplitude modulated mode. Referring to FIG. 2, an example of wavelength-intensity curves of infrared light beam is shown. For easy comparison of the first light source 11 with the second light source 12, the wavelength-intensity curve associated with the first infrared light beam and the wavelength-intensity curve associated with the second infrared light beam are shown in a same figure, i.e. FIG. 2. A curve C1 in a dashed rectangle R1 shows a wavelength-intensity curve of the first infrared light beam. A curve C2 in a dashed rectangle R2 shows a wavelength-intensity curve of the second infrared light beam. It can be seen from FIG. 2 that the light with a first central wavelength $\lambda_1$ has a highest intensity in the first infrared light beam. In addition, the light with a second central wavelength $\lambda 2$ has a highest intensity in the second infrared light beam. The first and the second central wavelengths $\lambda 1$ and $\lambda 2$ meet the following: 680 nanometers (nm for short)$<\lambda 1<\lambda 2<1050$ nm.

The image capturing device 20 includes two optical lenses 21, an infrared pass filter 22, an image sensor 23, a lens barrel 24, and a holder 25. The two optical lenses 21 are received in the lens barrel 24, and are spaced from each other. The infrared pass filter 22 is received in the holder 25. The lens barrel 24 is threadedly engaged with the holder 25. The image sensor 23 is arranged at one end of the holder 25 facing away from the lens barrel 24. The image sensor 23 can be a charge-coupled device (CCD) or a complementary metal oxide semiconductor device (CMOS). In this embodiment, the image sensor 23 is infrared sensitive, and can be a monochromatic sensor. The image sensor 23 includes a plurality of pixels arranged in an m by n (m x n) array, such as in a 1280×1024 array. The letters "m" and "n" denotes integers larger than one. In particular, the image sensor 23 is secured on a circuit board 230, and the circuit board 230 is attached to the holder 25.

Figure 3:
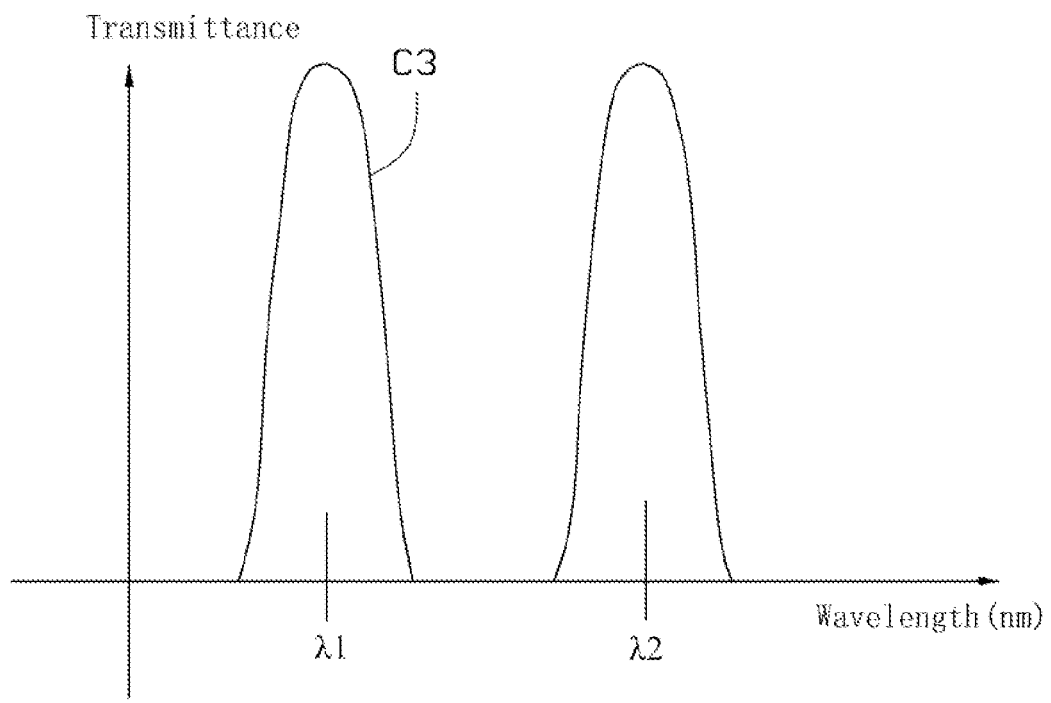
FIG. 3 shows a transmittance spectrum of a dual-pass-band infrared pass filter of FIG. 1.

An object 200 to be measured is spaced from the light source module 10 and the image capturing device 20. As shown in FIG. 1, the object 200 reflects the first infrared light beam and the second infrared light beam to the image capturing device 20. The first and the second infrared light beams enter the lens barrel 24. The optical lenses 21 focus the first and the second infrared light beams on the image sensor 23 through the infrared pass filter 22. The infrared pass filter 22 blocks all visible light, letting only infrared light beams with certain wavelength bands pass therethrough. In this embodiment, the infrared pass filter 22 can be a dual-pass-band infrared pass filter. In illustrating operation of the infrared pass filter 22, a curve C3 showing transmittance-wavelength band relationship of the infrared pass filter 22 in FIG. 3. The curve C3 has two peak values, which correspond to $\lambda 1$ and $\lambda 2$ of FIG. 2. It can be seen from FIG. 3 that most of the first or the second infrared light beam reflected by the object 200 can pass through the infrared pass filter 22. In other words, most of the first or the second infrared light beam reflected by the object 200 can be captured by the image capturing device 20. It also can be seen from FIG. 3 that, most of the interferential light can be blocked or received by the infrared pass filter 22.

The signal processing unit 40 is electrically connected to the image sensor 23. The control unit 30 is electrically connected to the first and the second light sources 11 and 12, as well as the signal processing unit 40 respectively. In one aspect, the control unit 30 controls the first and the second light sources 11 and 12 to emit the first and the second infrared light beams in an asynchronous manner, for example, to emit the first and the second infrared light beams at separate time intervals. The separate time intervals do not overlap one another. Accordingly, the object 200 reflects the first and the second infrared light beams at separate time intervals. In this embodiment, the first and the second infrared light beams have a same intensity. The image sensor 23 detects images of the first and the second infrared light beams reflected by the object 200, thus generating a first detection signal and a second detection signal respectively at separate time intervals. In general, the first and the second detection signals each are an electrical signal. Current intensity of the first detection signal is proportional to light intensity of the first infrared light beam detected by the image sensor 23. Similarly, current intensity of the second detection signal is proportional to light intensity of the second infrared light beam detected by the image sensor 23. The signal processing unit 40 receives the first and the second detection signals respectively. In particular, the signal processing unit 40 analyzes intensity of the first infrared light beam based on the first detection signal, thus generating a first processing signal. The first processing signal is associated with intensity of the first infrared light beam detected by the image sensor 23. Similarly, the signal processing unit 40 analyzes intensity of the second infrared light beam based on the second detection signal, thus generating a second processing signal. The second processing signal is associated with intensity of the second infrared light beam detected by the image sensor 23. In another aspect, the control unit 30 controls the signal processing unit 40 to store the first processing signal and the second processing signal respectively. Subsequently, the signal processing unit 40 outputs the first and the second processing signals to the selecting unit 50.

The selecting unit 50 is electrically connected to the signal processing unit 40. In operation, the selecting unit 50 receives the first and the second processing signals from the signal processing unit 40. Subsequently, the selecting unit 50 compares the first and the second processing signals. In particular, the selecting unit 50 selects one of the first and the second processing signals according to the intensities of the infrared light beam detected by the image sensor 23. In this embodiment, the selected processing signal is associated with the infrared light beam whichever has a greater intensity. In one example, the object 200 reflects the first infrared light beam higher than it reflects the second infrared light beam. That is, the object 200 absorbs less of the first infrared light beam than it absorbs of the second infrared light beam. In such a case, the intensity of the first infrared light beam detected by the image sensor 23 is greater than the intensity of the second infrared light beam detected by the image sensor 23. In such case, the first processing signal is selected. In another example, the intensity of the first infrared light beam detected by the image sensor 23 can be less than that of the second infrared light beam detected by the image sensor 23. Accordingly, the second processing signal is selected.

The distance calculating unit 60 is electrically connected to the selecting unit 50 and the control unit 30. In this embodiment, the distance calculating unit 60 is electrically connected to the selecting unit 50 to receive the selected processing signal. Meanwhile, the distance calculating unit 60 is electrically connected to the control unit 30 to receive an electrical signal associated with the predetermined intensity of the first infrared light beam or the second infrared light beam. In this embodiment, the first processing signal is received by the distance calculating unit 60. Thus, distance between the system 100 (for example, the image capturing device 20) and the object 200 is attained by analyzing, for example calculating, using the electrical signal and the first processing signal. In general, the distance between the system 100 and the object 200 is inversely proportional to intensity of the infrared light beam detected by the image sensor 23. In this embodiment, the distance calculating unit 60 generates an output signal associated with the distance when the distance is attained.

The display device 70 is electrically connected to the distance calculating unit 60 to receive the output signal, thus displaying the value of the distance.

One advantage of the system 100 is that the processing signal associated with the intensity of the infrared light beam detected by the sensor 23, which has a greater intensity can be firstly selected, and subsequently used to analyze the distance. Thus, accurate measurement of the distance of the object 200 relative to the system 100 can be achieved.

In this embodiment, the light source module 10 includes two light sources 11 and 12. In alternative embodiments, the light source module 10 may include more than two, for example three or four light sources for emitting more than two infrared light beams with a same predetermined intensity. In such case, the image sensor 23 detects the infrared light beams and respectively generates more than two detection signals. Accordingly, the signal processing unit 40 generates more than two processing signals. The selecting unit 50 selects one of the processing signals associated with the infrared light beam having the greatest intensity among all the infrared light beams detected by the image sensor 23.

Figure 4:
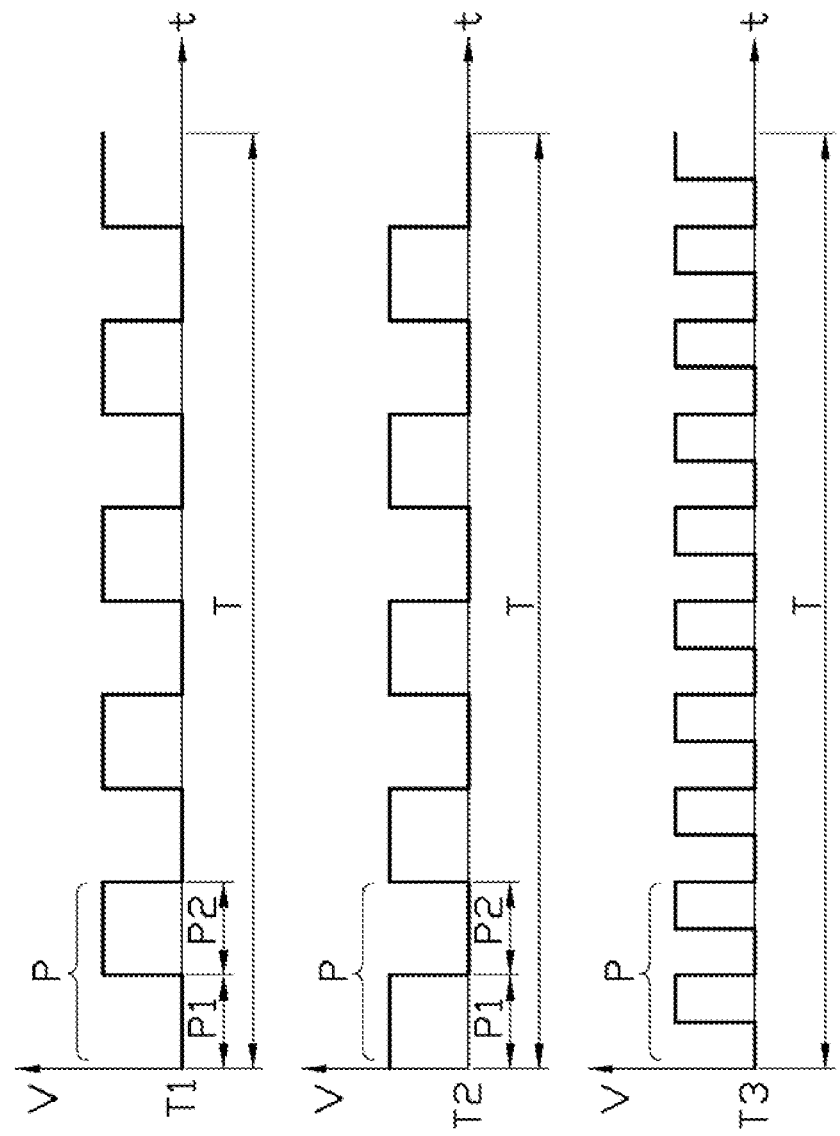
FIG. 4 is a waveform and timing graph of a first pulse signal output from the first light source, a second pulse signal output from the second light source, and a control pulse signal output from a control unit of FIG. 1.

In other alternative embodiments, the system 100 may operate in another manner different from the manner in the abovementioned embodiments. For example, the first and the second light sources 11 and 12 each emit an infrared light beam in the form of pulses. Referring to FIGS. 4, an example of waveform and timing graph of pulse signals are shown. For easy comparison of the first light source 11 with the second light source 12, the waveform and timing graph associated with the first light source 11 and the waveform and timing graph associated with the second light source 12 are shown in a same figure, i.e. FIG. 4. In this embodiment, the first light source 11 intermittently outputs a series of first pulse signals V1. The second light source 12 intermittently outputs a series of second pulse signals V2. As illustrated in FIG. 4, during a time interval of T, both the first pulse signal V1 and the second pulse signal V2 has a period P. The period P includes a first time interval P1 and a second time interval P2, wherein P1+P2=P, and P1=P2. The first time intervals P1 are (completely) separate from the second time intervals P2 during the time interval of T. In each period t, an amplitude value of the first pulse signal V1 in the first time interval of P1 is output from the first light source 11, and an amplitude value of the second pulse signal V2 in the second time interval of P2 is output from the second light source 12. In particular, the first and the second light sources 11 and 12 output the first and the second pulse signals V1 and V2 in an alternate fashion. The first and the second light sources 11 and 12 respectively output the first and the second pulse signals V1 and V2 for five times during the time interval of T.

The control unit 30 outputs a first control pulse signal and a second control pulse signal to the signal processing unit 40. In particular, in each period of P, the control unit 30 outputs an amplitude value of the first control pulse signal in time interval of P1, and an amplitude value of the second control pulse signal in time interval of P2. That is, the first and the second pulse signals are output in an alternate fashion. The first and the second pulse signals have a same value of V3. Each of first and the second control pulse signals are output respectively for five times during the time interval of T.

In operation of this embodiment, in one aspect, the signal processing unit 40 stores the intensity values of the first pulse signals V1 reflected by the object 200 and detected by the image sensor 23 when receiving the first control pulse signals. In another aspect, the signal processing unit 40 stores the intensity values of the second pulse signals V2 reflected by the object 200 and detected by the image sensor 23 when receiving the second control pulse signals. In this embodiment, the intensity values of five first pulse signals V1 are stored and summarized, thus an average intensity value of the first pulse signals V1 is attained by for example, analyzing or calculation. Accordingly, a first processing signal is associated with the average intensity value of the first pulse signals V1 is sent from the signal processing unit 40. Similarly, an average intensity value of the second pulse signals V2 is analyzed or calculated, and a second processing signal associated with the average intensity value of the second pulse signals V2 is sent from the signal processing unit 40. Subsequently, the selecting unit 50 selects one of the first and the second processing signals associated with the infrared light beam which has greater intensity by comparing the average intensity value of the first pulse signals V1 and the average intensity value of second pulse signals V2. When one of the average intensity value of the first pulse signal V1 and the average intensity value of the second pulse signal V2 is selected, the selected average intensity value is sent to the distance calculating unit 60. As such, distance between the system 100 and the object 200 is attained by for example analyzing or calculating, using the electrical signal and the selected average intensity value.

It is noted, is this embodiment, distance between the system 100 and the object 200 can be attained by using accurately average intensity value and the predetermined intensity value. Thus, more accurate measurement of the distance can be achieved.

It is understood that the above-described embodiments are intended to illustrate rather than limit the disclosure. Variations may be made to the embodiments without departing from the spirit of the disclosure. Accordingly, it is appropriate that the appended claims be construed broadly and in a manner consistent with the scope of the disclosure.

What is claimed is:

1. A distance measuring system, comprising:
a light source module for emitting a first infrared light beam and a second infrared light beam in an alternating manner to a measurement object, the first infrared light beam having a first central wavelength, the infrared light beam having a second central wavelength, the first infrared light beam having a same intensity with the second infrared light beam;
an image capturing device configured for capturing images of the first and second infrared light beams reflected by the measurement object;
a signal processing unit configured for analyzing the images of the first and second infrared light beams reflected by the measurement object to determine intensities thereof;
a selecting unit configured for selecting one of the first and second reflected infrared light beams whichever has a greater intensity;
a distance calculating unit configured for calculating a distance to the object from to the distance measuring system according to the intensity of the selected one of the first and second reflected infrared light beams.

2. The distance measuring system of claim 1, further comprising a control unit wherein the image capturing device is configured for generating detection signals associated with images of the first and second reflected infrared light beams, the signal processing unit is configured for generating processing signals associated with the intensities of the first and second reflected infrared light beams, and the control unit is configured for controlling the signal processing unit to store the detection signals and to output the processing signals to the selecting unit.

3. The distance measuring system of claim 2, wherein the control unit is configured to control the light source module to emit the first and second infrared light beams in the form of continuous amplitude modulated mode.

4. The distance measuring system of claim 1, wherein the image capturing device comprises an infrared sensitive image sensor and an infrared pass filter having two passbands for only allowing the first and the second infrared light beams to pass therethrough.

5. The distance measuring system of claim 2, wherein the control unit is configured to control the light source module to emit the first and second infrared light beams in an alternate fashion.

6. The distance measuring system of claim 4, wherein the image capturing device comprises an optical lens for focusing the first and second infrared light beams on the image sensor.

7. The distance measuring system of claim 4, wherein the image sensor is a monochromatic sensor.

8. The distance measuring system of claim 1, wherein the light source module comprises first and second infrared emitting diodes for respectively emitting the first and second infrared light beams.

9. The distance measuring system of claim 1, wherein the wavelength of each of the first and second infrared light beams is in a range from 680 nm to 1050 nm.

10. The distance measuring system of claim 1, further comprising a display device for displaying the value of the distance to the measurement object.

11. A distance measuring system, comprising:
a first light source configured for emitting a first pulsed infrared light beam of a first central wavelength toward an object;
a second light source configured for emitting a second pulsed infrared light beam of a second central wavelength different from the first central wavelength toward the object, and an intensity of the first infrared light beam being equal to an intensity of the second infrared light beam;
a control unit configured for controlling the first and the second light sources to alternately emit the respective first and second pulsed infrared light beams;
an image capturing device configured for capturing images of the first and the second pulsed infrared light beams reflected by the object and generating two respective detection signals associated therewith, the image capturing device comprising an infrared sensitive image sensor and an infrared pass filter having two passbands for only allowing the first and second pulsed infrared light beams to pass therethrough;
a signal processing unit configured for determining intensities of the first and the second infrared light beams based on the respective detection signals and generating processing signals associated with the intensities of the respective first and second reflected pulsed infrared light beams;
a selecting unit configured for selecting one of the first and second reflected pulsed infrared light beams whichever has a greater intensity;
a distance calculating unit configured for calculating a distance to the object from the distance measuring system according to the intensity of the selected one of the first and second reflected pulsed infrared light beams.

12. The distance measuring system of claim 11, wherein the control unit is configured for controlling the signal processing unit to store the detection signals and to output the processing signals to the selecting unit.

13. The distance measuring system of claim 11, wherein the control unit is configured to control the first and second light sources to respectively emit the first and second infrared light beams in the form of continuous amplitude modulated mode.

14. The distance measuring system of claim 11, wherein the control unit is configured to control the first and second light sources to emit the first and second infrared light beams in an alternate fashion.

15. The distance measuring system of claim 11, wherein the image capturing device comprises an optical lens for focusing the first and second infrared light beams on the image sensor.

16. The distance measuring system of claim 11, wherein the image sensor is a monochromatic sensor.

17. The distance measuring system of claim 11, wherein the first light source comprises a first infrared emitting diode for emitting the first pulsed infrared light beams, and the second light source comprises a second infrared emitting diode for emitting the second pulsed infrared light beams.

18. The distance measuring system of claim 11, wherein the central wavelength of each of the first and second pulsed infrared light beams is in a range from 680 nm to 1050 nm.

19. The distance measuring system of claim 11, further comprising a display device for displaying a value of the distance.

20. A distance measuring system, comprising:
a first light source configured for emitting a first pulsed infrared light beam of a first central wavelength;
a second light source configured for emitting a second pulsed infrared light beam of a second central wavelength different from the first central wavelength toward an object, with an intensity of the first pulsed infrared light beam being equal to an intensity of the second pulsed infrared light beam,
a control unit configured for controlling the first and second light sources to alternately emit the first and second pulsed infrared light beams;
an image capturing device configured for capturing images of the first pulsed infrared light beam reflected by the object and generating first detection signals associated with light intensities of the first pulsed infrared light beam at different pulse periods thereof, and for capturing images of the second pulsed infrared light beam reflected by the object and generating second detection signals associated with light intensities of the second pulsed infrared light beam at different pulse periods thereof, and the image capturing device comprising an infrared sensitive image sensor and an infrared pass filter having two passbands for only allowing the first pulsed infrared light beam and the second pulsed infrared light beam to pass therethrough;
a signal processing unit configured for analyzing the intensities of the first pulsed infrared light beam based on the first detection signals and generating a first processing signal associated an average intensity of the first pulsed infrared light beam captured by the image capturing device, and for analyzing the intensities of the second pulsed infrared light beam based on the second detection signals and generating a second processing signal associated an average intensity of the second pulsed infrared light beam captured by the image capturing device;
a selecting unit configured for selecting one of the first and the second pulsed infrared light beams captured by the image capturing device whichever has a greater average intensity; and
a distance calculating unit configured for calculating a distance of the object relative to the distance measuring system according to the average intensity of the selected one of the first and the second pulsed infrared light beams captured by the image capturing device.

* * * * *